US009527478B2

(12) United States Patent
Flick

(10) Patent No.: US 9,527,478 B2
(45) Date of Patent: Dec. 27, 2016

(54) REMOTE FUNCTION CONTROL SYSTEM FOR A VEHICLE HAVING A DATA COMMUNICATIONS BUS AND RELATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 9 days.

(21) Appl. No.: 14/697,913

(22) Filed: Apr. 28, 2015

(65) Prior Publication Data

US 2015/0246658 A1 Sep. 3, 2015

Related U.S. Application Data

(63) Continuation-in-part of application No. 13/826,752, filed on Mar. 14, 2013.

(51) Int. Cl.
*B60R 25/24* (2013.01)
*B60R 16/023* (2006.01)
(Continued)

(52) U.S. Cl.
CPC ............. *B60R 25/24* (2013.01); *B60K 35/00* (2013.01); *B60R 16/023* (2013.01); *G06F 7/00* (2013.01);
(Continued)

(58) Field of Classification Search
None
See application file for complete search history.

(56) References Cited

U.S. PATENT DOCUMENTS 4,055,772 A 10/1977 Leung
4,383,242 A 5/1983 Sassover et al.
(Continued)

OTHER PUBLICATIONS

SAE International, Surface Vehicle Standard, Class B Data Communications Network Interface, SAE J1850, Jul. 1995, pp. 1-52.
(Continued)

*Primary Examiner* — John R Olszewski
*Assistant Examiner* — James M McPherson
(74) *Attorney, Agent, or Firm* — Allen, Dyer, Doppelt, Milbrath & Gilchrist, P.A.

(57) ABSTRACT

A remote function control system is for a vehicle including a data communications bus extending throughout the vehicle and coupled to a plurality of vehicle devices, and a wired vehicle electrical power system. The system may include a wireless data bus device coupled to the wired vehicle electrical power system and including a wired interface coupled to the data communications bus in the vehicle, and a memory to store vehicle device bus codes for the plurality of vehicle devices. A remote function device may be coupled to the wired vehicle electrical power system and may include a controller to wirelessly receive updated vehicle device bus codes from the remote control device to cause at least one of the vehicle devices to perform a new vehicle operation, and wirelessly transmit the updated data bus codes to the wireless data bus device to be stored in the memory.

42 Claims, 12 Drawing Sheets

(51) Int. Cl.
*B60K 35/00* (2006.01)
*G06F 7/00* (2006.01)

(52) U.S. Cl.
CPC .... *B60K 2350/355* (2013.01); *B60K 2350/357* (2013.01)

(56) References Cited

U.S. PATENT DOCUMENTS

| | | | |
|---|---|---|---|
| 4,538,262 A | 8/1985 | Sinniger et al. | |
| 4,697,092 A | 9/1987 | Roggendorf et al. | |
| 4,760,275 A | 7/1988 | Sato et al. | |
| 4,792,783 A | 12/1988 | Burgess et al. | |
| 5,146,215 A | 9/1992 | Drori | |
| 5,252,966 A | 10/1993 | Lambropoulos et al. | |
| 5,719,551 A | 2/1998 | Flick | |
| 6,011,460 A | 1/2000 | Flick | |
| 6,747,365 B2 * | 6/2004 | Reinold | H04L 45/00 307/9.1 |
| 6,756,885 B1 | 6/2004 | Flick | |
| 6,812,829 B1 | 11/2004 | Flick | |
| 6,924,750 B2 | 8/2005 | Flick | |
| 7,010,402 B2 | 3/2006 | Flick | |
| 7,015,830 B2 * | 3/2006 | Flick | B60R 25/04 340/989 |
| 7,031,826 B2 * | 4/2006 | Flick | B60R 16/03 307/10.3 |
| 7,091,822 B2 | 8/2006 | Flick | |
| 7,277,010 B2 | 10/2007 | Joao | |
| 7,379,730 B2 | 5/2008 | Flick | |
| 7,504,931 B2 | 3/2009 | Nguyen | |
| 7,734,382 B2 | 6/2010 | Flick | |
| 7,818,097 B2 | 10/2010 | Fein | |
| 8,032,278 B2 * | 10/2011 | Flick | B60R 25/04 382/104 |
| 8,269,601 B2 | 9/2012 | Burzio | |
| 8,313,039 B2 | 11/2012 | Flick et al. | |
| 8,346,432 B2 | 1/2013 | Van Wiemeersch et al. | |
| 8,362,886 B2 * | 1/2013 | Flick | B60R 25/209 340/12.22 |
| 8,410,929 B2 | 4/2013 | Flick et al. | |
| 8,432,268 B2 | 4/2013 | Flick | |
| 8,489,085 B2 | 7/2013 | Simmons | |
| 2005/0222720 A1 * | 10/2005 | Flick | B60R 25/00 701/2 |
| 2006/0080007 A1 | 4/2006 | Gerard et al. | |
| 2008/0039998 A1 * | 2/2008 | Fein | B60R 16/037 701/36 |
| 2013/0099892 A1 | 4/2013 | Tucker et al. | |
| 2013/0103200 A1 | 4/2013 | Tucker et al. | |
| 2014/0277838 A1 | 9/2014 | Flick | |

OTHER PUBLICATIONS

SAE International, Surface Vehicle Information Report, Chrysler Sensor and Control (CSC) Bus Multiplexing Network for Class 'A' Applications, SAE J2058, Jul. 1990, pp. 1-21.
Thompson, IEEE Spectrum, The Thick and Thin of Car Cabling, Feb. 1996, pp. 42-45.

* cited by examiner

REMOTE FUNCTION CONTROL SYSTEM FOR A VEHICLE HAVING A DATA COMMUNICATIONS BUS AND RELATED METHODS

FIELD OF THE INVENTION

The present invention relates to the field of vehicle control systems and, more particularly, to a remote function control system and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42-45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle control systems, such as aftermarket vehicle security systems, are for hardwired connection to vehicle devices and are not readily adaptable to a vehicle including a data communications bus. Moreover, a vehicle security system if adapted for a communications bus and devices for one particular model, model year, and manufacturer, may not be compatible with any other models, model years, or manufacturers. Other systems for the control of vehicle functions may also suffer from such shortcomings.

One approach to addressing these shortcomings is described in U.S. Pat. No. 6,011,460 to Flick which discloses a multi-vehicle security system. More particularly, the Flick '460 patent discloses a desired signal enabling circuit electrically coupled to the data communications bus for enabling an alarm controller to operate using a set of desired signals for a desired vehicle from among a plurality of possible sets of signals for different vehicles. Thus, the desired signal enabling circuit permits the alarm controller to communicate with a vehicle security sensor and an alarm indicator via the data communications bus so that the alarm controller is capable of operating the alarm indicator responsive to the vehicle security sensor. The desired signal enabling circuit may learn the desired set of signals from the plurality of different sets of signals for different vehicles by connection and communications with a downloading device, such as a portable or laptop computer.

However, still further improvements for remote control device operation of vehicle devices, for example, a security system, remote start system, etc., may be desired. In particular, it may desirable to more easily configure or adapt a wider range of vehicle devices to be operated from a remote control device.

SUMMARY OF THE INVENTION

A remote function control system is provided for a vehicle including a data communications bus extending throughout the vehicle and coupled to a plurality of vehicle devices, and a wired vehicle electrical power system. The system may include a wireless data bus device coupled to the wired vehicle electrical power system and including a wired interface coupled to the data communications bus in the vehicle, a memory to store vehicle device bus codes for the plurality of vehicle devices, and a first wireless device. The system may further include a remote function device coupled to the wired vehicle electrical power system and including a second wireless device to wirelessly communicate within the vehicle with the first wireless device, a third wireless device to wirelessly communicate with a remote control device away from the vehicle, and a controller coupled to the second and third wireless devices to receive updated vehicle device bus codes from the remote control device to cause at least one of the vehicle devices to perform a new vehicle operation, and wirelessly transmit the updated data bus codes to the wireless data bus device to be stored in the memory.

More particularly, the at least one vehicle device may comprise at least one convertible top actuator, and the updated data bus codes may be for causing the at least one convertible top actuator to raise and lower a convertible top. In accordance with another example, the at least one vehicle device may comprise at least one vehicle window actuator, and the updated data bus codes may be for causing the at least one vehicle window actuator to raise and lower at least one vehicle window. In still another example, the updated data bus codes may be for causing the at least one vehicle device to perform a vehicle remote start operation.

The controller may comprise a multi-vehicle compatible controller to be operable with a plurality of different vehicles using respective different bus protocols. In accordance with another example, the controller may comprise a multi-vehicle compatible controller to be operable with a plurality of different vehicles using respective different wireless communications protocols of the first wireless device. In still another example, the controller may comprise a multi-vehicle compatible controller to be operable with a plurality of different vehicles using respective different wireless communications codes of the first wireless device.

The controller may permit communication for the remote control device to command the at least one vehicle device. Furthermore, the remote function device may further include a downloading interface coupled to the controller to permit downloading the updated vehicle device bus codes. By way of example, the first and second wireless devices may comprise first and second wireless local area network (WLAN) transceivers. In accordance with another example, the first and second wireless devices may comprise first and second Bluetooth® transceivers.

In an example embodiment, the third wireless communications device may comprise a satellite transceiver. In accordance with another example embodiment, the third wireless communications device may comprise a cellular transceiver. By way of example, the remote control device may comprise a cellular telephone, a remote monitoring station, etc. The remote function device may further include a vehicle position determining device coupled to the controller, and the controller may comprise a tracking controller to perform at least one tracking function based upon vehicle position. Also, the remote function device may be removably coupled to the wired vehicle electrical power system.

A related remote function device, such as the one described briefly above, is also provided. Furthermore, a related method is also provided for remotely controlling a vehicle function with a wireless data bus coupled to a wired vehicle electrical system in a vehicle including a data communications bus extending throughout the vehicle and coupled to a plurality of vehicle devices. The wireless data bus device may include a wired interface coupled to the data communications bus in the vehicle, a memory coupled to the wired interface to store vehicle device bus codes for the plurality of vehicle devices, and a first wireless device coupled to the wired interface. The method may include using a remote function device coupled to the wired vehicle electrical power system to wirelessly communicate via a second wireless device within the vehicle with the first wireless device, wirelessly communicate via a third wireless device with a remote control device away from the vehicle, and receive updated vehicle device bus codes from the remote control device via a controller coupled to the second and third wireless devices to cause at least one of the vehicle devices to perform a new vehicle operation, and wirelessly transmit the updated data bus codes to the wireless data bus device to be stored in the memory.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
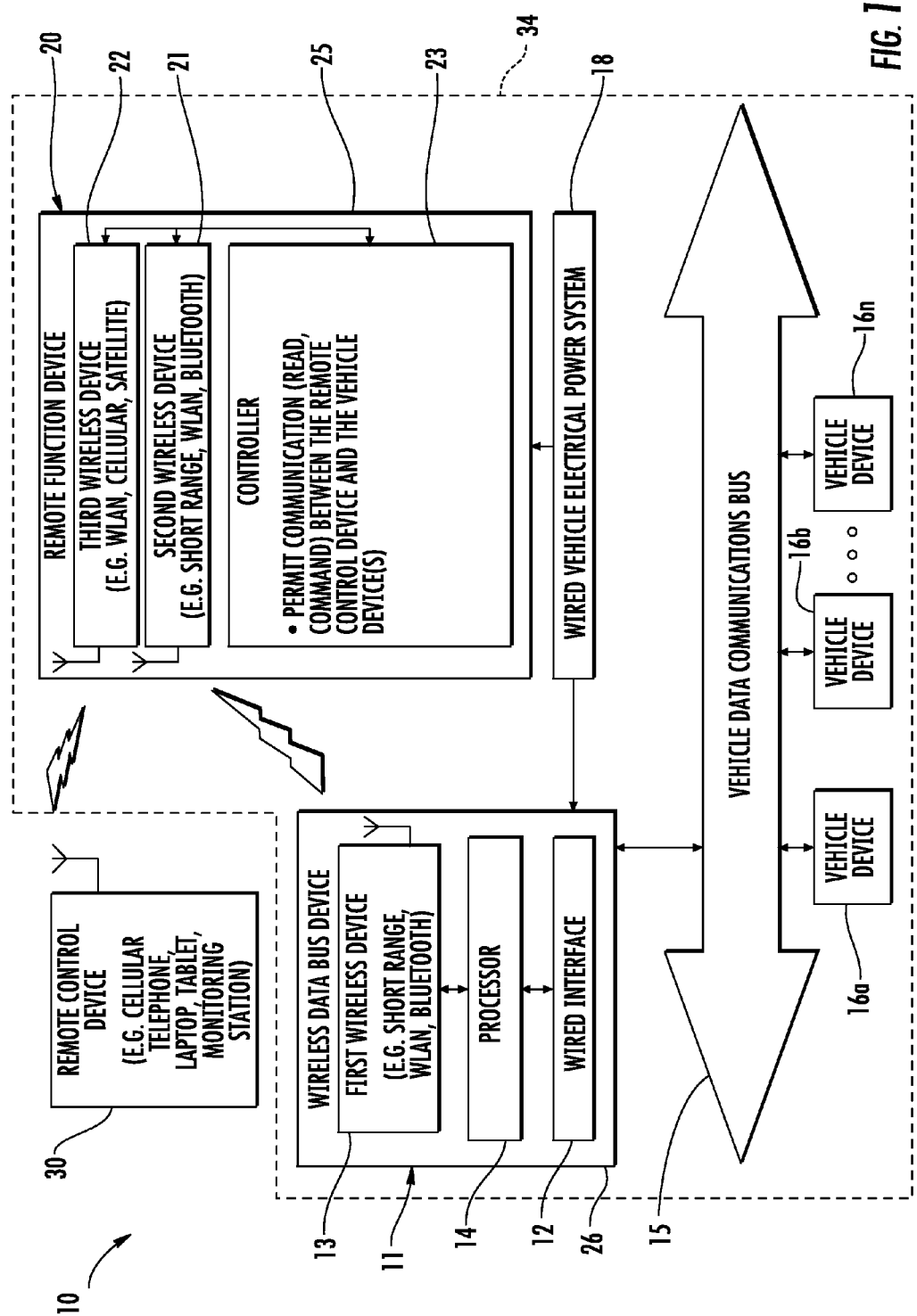
FIG. 1 is a block diagram of a remote function control system in accordance with the present invention.

Referring initially to FIG. 1, a remote function control system 10 for a vehicle 34 including a data communications bus 15 extending throughout a vehicle 34 and connecting a plurality of vehicle devices 16a-16n within the vehicle is illustrated. For example, such vehicle devices 16a-16n may be sensors or controllers as disclosed in U.S. Pat. Nos. 5,719,551 and 6,011,460 to Flick, assigned to the present assignee, and the entire contents of both of which are herein incorporated by reference. The vehicle also includes a wired vehicle electrical power system 18. The wired vehicle electrical power system 18 may provide power to electronic device within the vehicle and may include a vehicle battery and/or vehicle alternator, for example, as will be appreciated by those skilled in the art.

The remote function control system 10 illustratively includes a wireless data bus device 11 and a remote function device 20. The wireless data bus device 11 is coupled to the vehicle wired electrical power system 18 and includes a wired interface 12 coupled to the data communications bus 15. The wireless data bus device 11 may also include a first wireless device 13 coupled to the wired interface 12 for wirelessly communicating with the remote function device 20. The first wireless device 13 may be a short-range wireless device. For example, the first wireless device 13 may be a Bluetooth® transceiver, and/or a wireless local area network (WLAN) transceiver. Of course, the first wireless device 13 may be another type of transceiver and/or may be able to communicate via more than one wireless protocol, for example, either Bluetooth® or WLAN.

The wireless data bus device bus device 11 also illustratively includes a processor 14 coupled to the first wireless device 13 and the wired interface 12 for performing the functions described herein. The wireless data bus device 11 illustratively includes a first housing 26.

The remote function device 20 is also coupled to the wired vehicle electrical power system 18 and illustratively includes a second housing 25. The remote function device 20 illustratively includes a second wireless device 21 for wirelessly communicating within the vehicle 34 with the first wireless device 13. More particularly, similarly to the first wireless device 13, the second wireless device 21 may also be a short-range wireless device. For example, the second wireless device may be a Bluetooth® transceiver, and/or a WLAN transceiver. Of course, the second wireless device 21 may be another type of transceiver and/or may be communicate via more than one wireless protocol, for example, either Bluetooth® or WLAN.

The remote function device 20 also includes a third wireless device 22 to wirelessly communicate with a remote control device 30. In some embodiments, the third wireless device 21 may be a cellular transceiver and/or a satellite transceiver. In other embodiments, the third wireless device 22 may be a short range wireless device, for example, a WLAN or Bluetooth® transceiver. Of course, the third wireless device 22 may be another type of device communicating over another protocol, as will be appreciated by those skilled in the art.

The remote function device 20 also may include a controller 23 coupled to the second and third wireless devices 21, 22 to permit communication between the remote control device 30 away from the vehicle and the vehicle devices 16a-16n coupled to the vehicle data communications bus 15. More particularly, the controller permits the remote control device 30 to read from the vehicle devices 16a-16n and for the remote control device to command the vehicle's devices.

The remote control device 30 may be a cellular telephone and may receive a status of a vehicle device 16a-16n, for example, the door locks. The cellular telephone 30 may communicate with the remote function device 20 using a cellular communications protocol, for example. Alternatively, the cellular telephone 30 may include a WLAN transceiver and may communicate with the remote function device 20 using a WLAN protocol. In some embodiments, where, for example, the cellular telephone 30 is equipped with both cellular and WLAN and/or Bluetooth® transceivers, the cellular telephone may communicate with the remote control function device 20 using the WLAN or Bluetooth® transceivers when within a relatively short range to the remote function device, and may communication using the cellular transceiver when outside the WLAN or Bluetooth® range. Of course, when there is relative movement between the cellular telephone 30 and the remote function device 20, the cellular telephone may initially communicate with the remote function device via the cellular transceiver and switch to one of the WLAN/Bluetooth® transceivers when within range.

In other embodiments, the remote control device 30 may be a remote monitoring station. For example, vehicle devices 16a-16n, such as, door locks may be wirelessly controlled, for example, when a vehicle operator has locked themselves out of the vehicle 35. The remote monitoring station 30 may communicate with the third wireless device 22 via a satellite, for example. Additionally, the remote monitoring station 30 may wirelessly receive a status of vehicle safety devices, for example, crash sensors or airbag deployment sensors. In response, personnel at the remote monitoring station 30 may wirelessly enable or disable certain vehicle devices 16a-16n, for example, disable the engine 16n. The remote monitoring station 30 may also be connected to other communications infrastructure, as will be appreciated by those skilled in the art.

The remote control device 30 may be a FOB, for example, and communicate using a WLAN protocol. Of course, the remote control device 30 may another wireless device, for example, a laptop or tablet computer.

Figure 2:
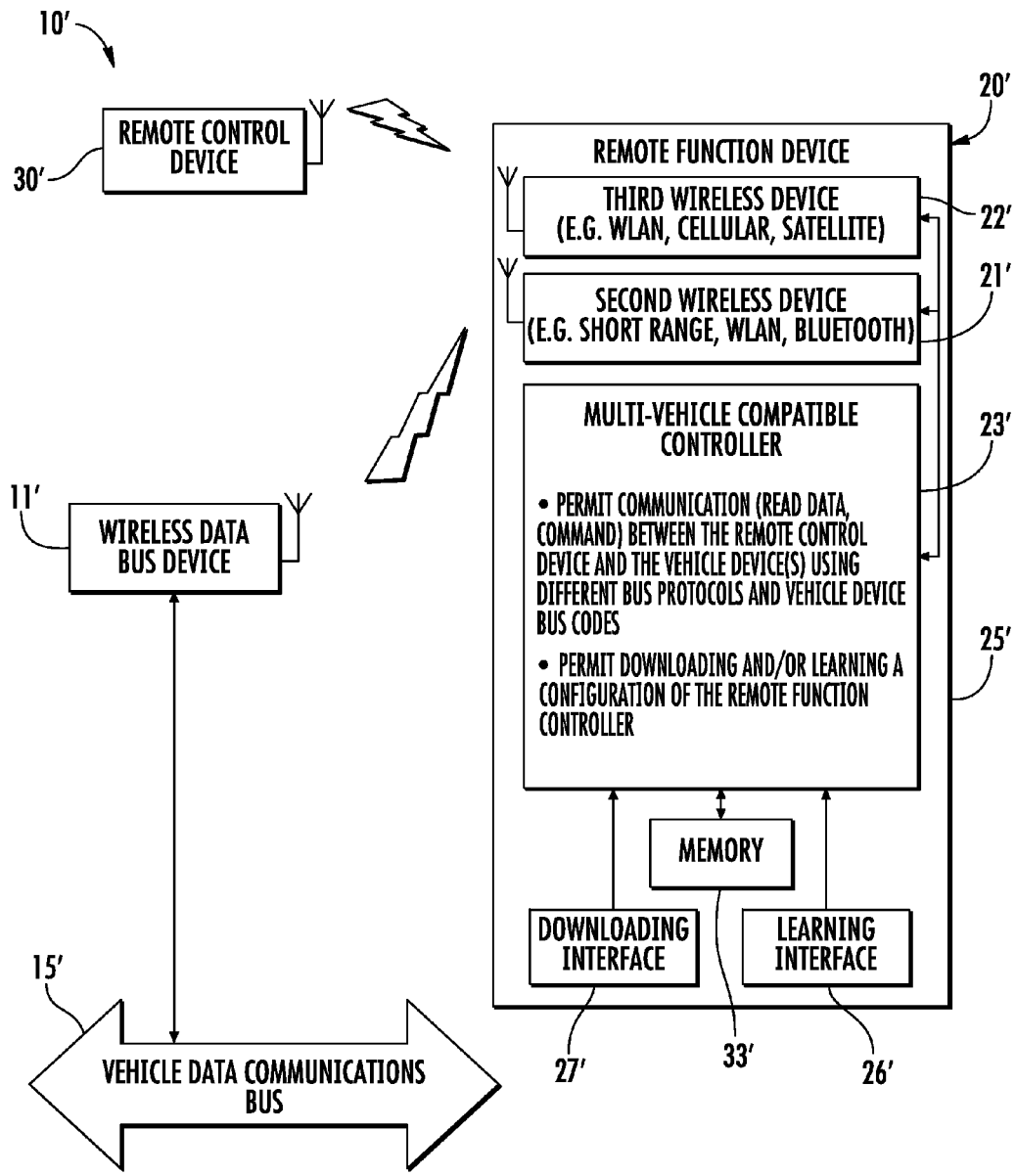
FIG. 2 is a block diagram of a remote function control system including a multi-function compatible controller in accordance with an embodiment of the present invention.

Referring now additionally to FIG. 2, in another embodiment, the controller 23' is a multi-vehicle compatible controller. The multi-vehicle compatible controller 23' is operable with different vehicles using different data bus protocols and/or different vehicle device bus codes. As will be appreciated by those skilled in the art, the vehicle device bus codes may be unique to each vehicle or vehicle manufacturer. In some embodiments, the different data bus codes and/or data bus protocols may be stored in a memory 33' coupled to the multi-vehicle compatible controller 23'. The remote function device 20' can be configured to change or set the protocol of the data communications bus 15', the vehicle device bus codes, and the protocol of the second and third wireless devices 21', 22'. For example, the remote function device 20' may request one or more of the vehicle identification number (VIN), the mileage, and fuel level of the vehicle via data communications bus 15' using a first protocol. If a response to the request is received, the correct protocol has been selected. Otherwise, the remote function device 20' may select another protocol and make another request using the newly selected protocol. The process may be repeated until a response is received. The remote function device 20' may also be programmed to selectively enable features of the controller 23', as will be appreciated by those skilled in the art. Further details regarding a multi-vehicle compatible controller are disclosed in U.S. Pat. Nos. 5,719,551 and 6,011,460 to Flick, for example.

To program the multi-vehicle compatible controller 23', the remote function device 20' may include a downloading interface 27' coupled to the controller to permit downloading a configuration of the controller. The downloading interface 27' may be a wired interface for coupling to a programming device, for example, a laptop or tablet computer. Programming or configuration, as noted above, may be performed via downloading from the programming device to the remote function device 20'. Of course, the downloading interface 27' may be a wireless interface, for example, so that the multi-vehicle compatible controller 23' may be configured or programmed wirelessly, via the Internet or cellular connection, from a programming device. The multi-vehicle compatible controller 23' may be programmed or configured within the vehicle or may be removed from the vehicle for programming. Further details of programming a multi-vehicle compatible controller 23' may be found in U.S. Pat. No. 8,032,278 to Flick, assigned to the present assignee, and the entire contents of which are herein incorporated by reference. Other or additional programming or configuration techniques may be used, as will be appreciated by those skilled in the art.

The remote function device 20' may further include a learning interface 26' coupled to the multi-vehicle compatible controller 23' to permit learning a configuration of the controller. For example, new or unrecognized configuration parameters, particularly, data bus or communications codes, may be learned as they are communicated, and thereafter stored in the memory 33'. Other or additional learning techniques may be used, as will be appreciated by those skilled in the art. The downloading interface 27' and the learning interface 26' may be particularly useful with the multi-vehicle compatible controller 23' for downloading and learning the vehicle device bus codes and protocols.

Figure 3:
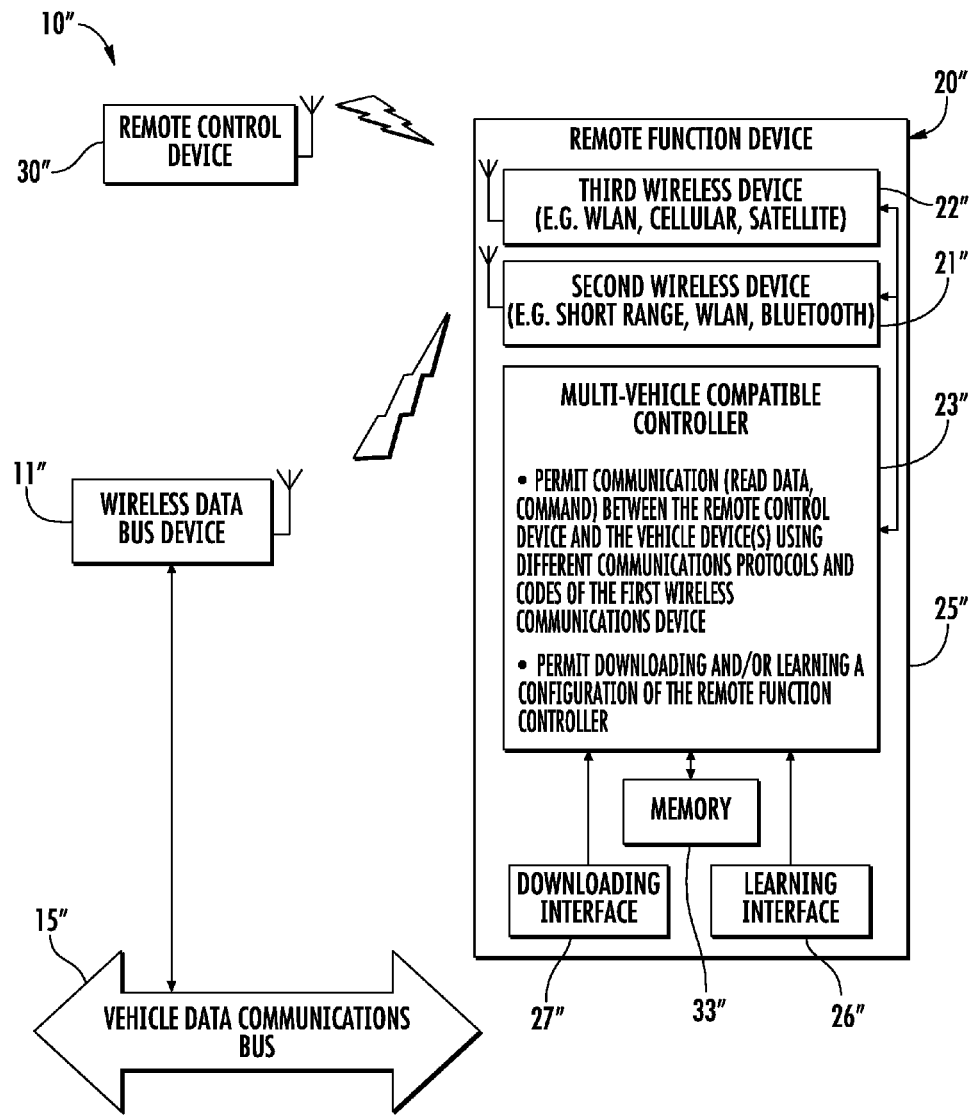
FIG. 3 is a block diagram of a remote function control system including a multi-function compatible controller in accordance with another embodiment of the present invention.

Referring now additionally to FIG. 3, in yet another embodiment, the controller 23" is a multi-vehicle compatible controller that is operable with different vehicles using different wireless communications protocols and/or codes of the first wireless communications device 13". For example, the multi-vehicle compatible controller 23" may be operable with different vehicles using Bluetooth® and/or WLAN protocols and/or associated codes of the first wireless communications device 13". A downloading interface 27" coupled to the multi-vehicle compatible controller 23' permits downloading a configuration of the controller, and more particularly, the different wireless communications protocols and/or codes of the first wireless device 13". A learning interface 26" is also coupled to the multi-vehicle compatible controller 23" to permit learning a configuration of the controller with respect to the communications codes and/or protocols of the first wireless device 13".

Figure 4:
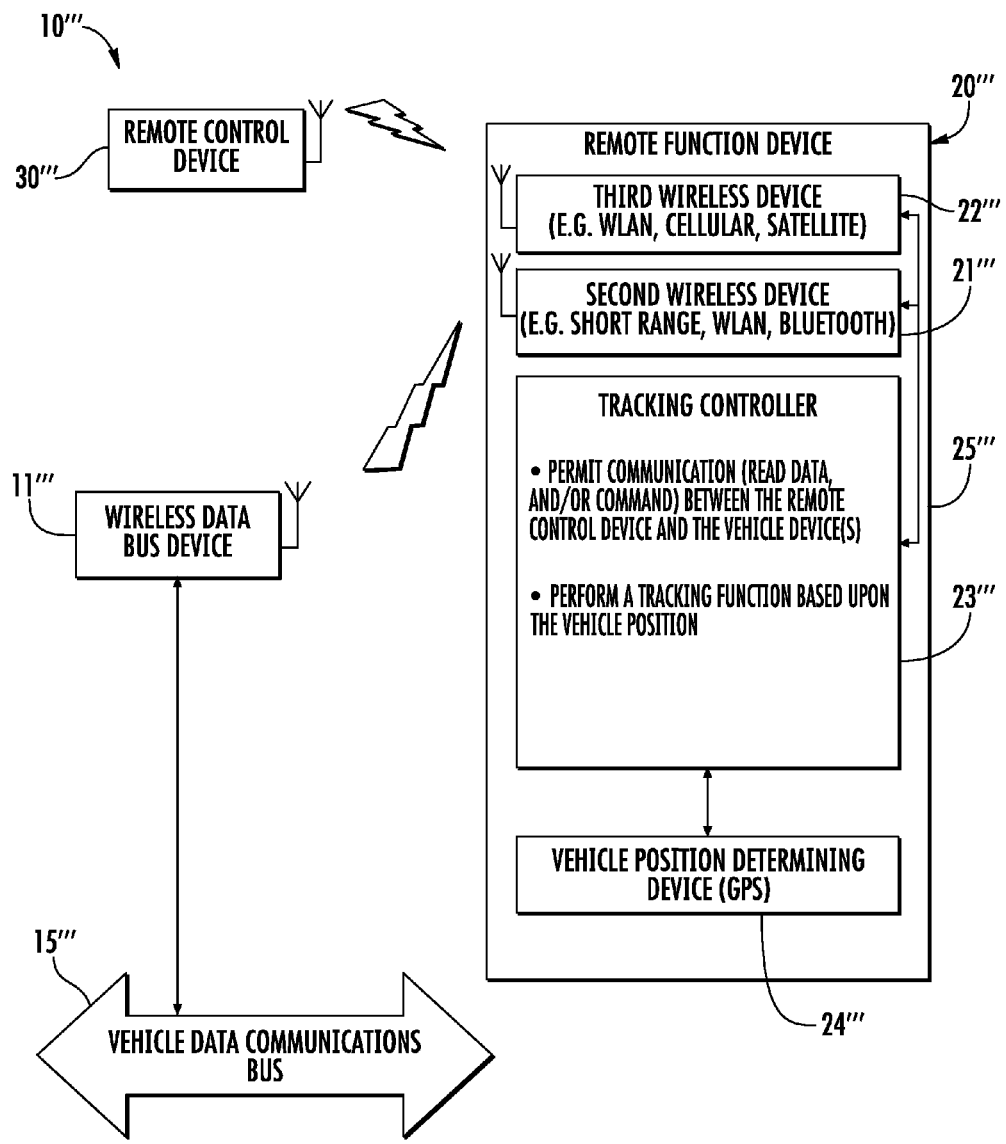
FIG. 4 is a block diagram of a remote function control system including a tracking controller in accordance with an embodiment of the present invention.

Referring now additionally to FIG. 4, in yet another embodiment, the remote function device 20'" includes a vehicle position determining device 24'", for example, a global positioning system (GPS) receiver, coupled to a tracking controller 23'". The tracking controller 23'" is for performing a tracking function based upon the vehicle location, for example, for which may be used to determine a vehicle condition or status, i.e., stolen. Vehicle device functions may be controlled by the tracking controller 23'" based upon the vehicle position. Further details of a vehicle tracking unit for controlling operable vehicle devices using a data communications bus are disclosed in U.S. Pat. No. 6,924,750, assigned to the present assignee, and the entire contents of which are herein incorporated by reference.

Figure 5:
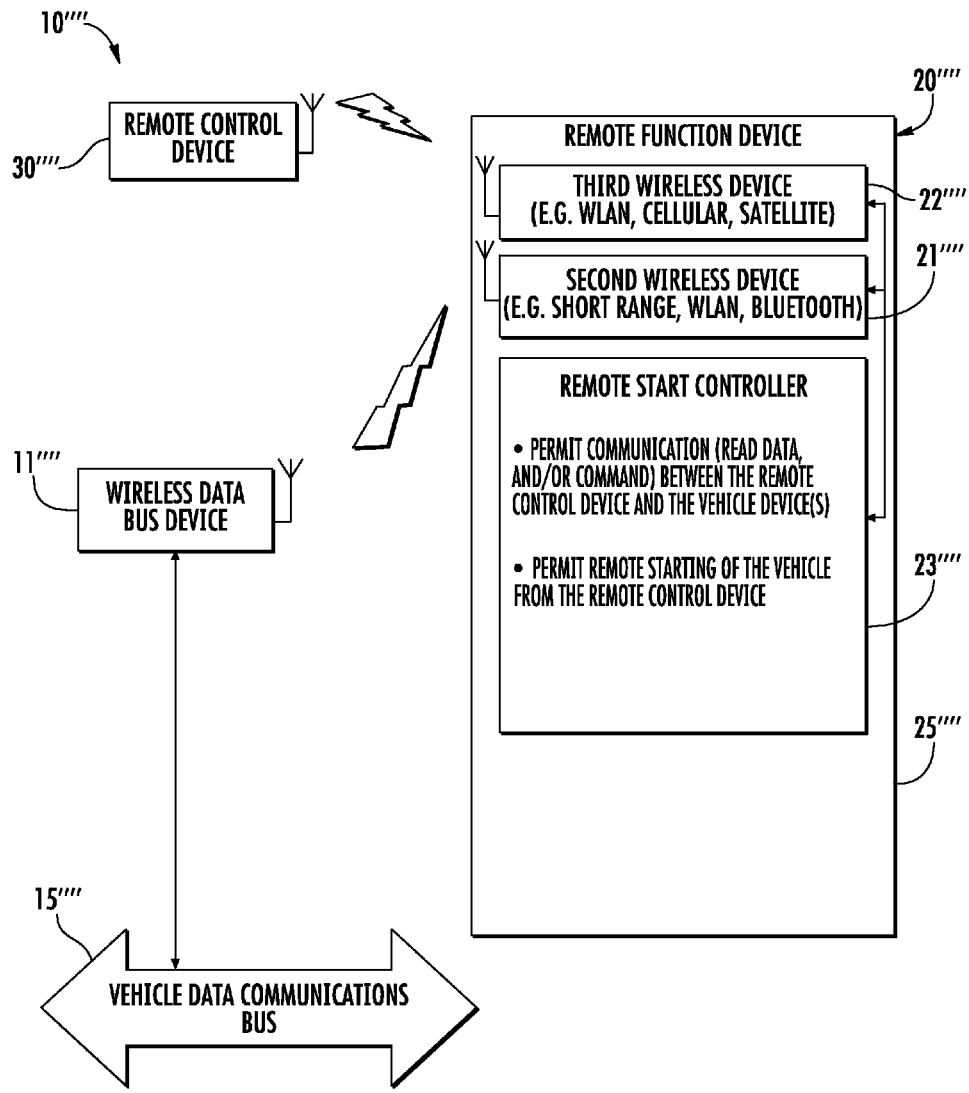
FIG. 5 is a block diagram of a remote function control system including a remote start controller in accordance with an embodiment of the present invention.

Referring now additionally to FIG. 5, in some embodiments, the controller 23"" may be a remote start controller for performing a remote start function, for example, as described in U.S. Pat. No. 6,812,829, assigned to the present assignee, and the entire contents of which are herein incorporated by reference. For example, the remote control device 30"" may cooperate with the remote start controller 23"" to wirelessly communicate with a starter vehicle device and/or fuel supply system coupled to the vehicle data bus 15"", to thus start the vehicle 35"".

Figure 6:
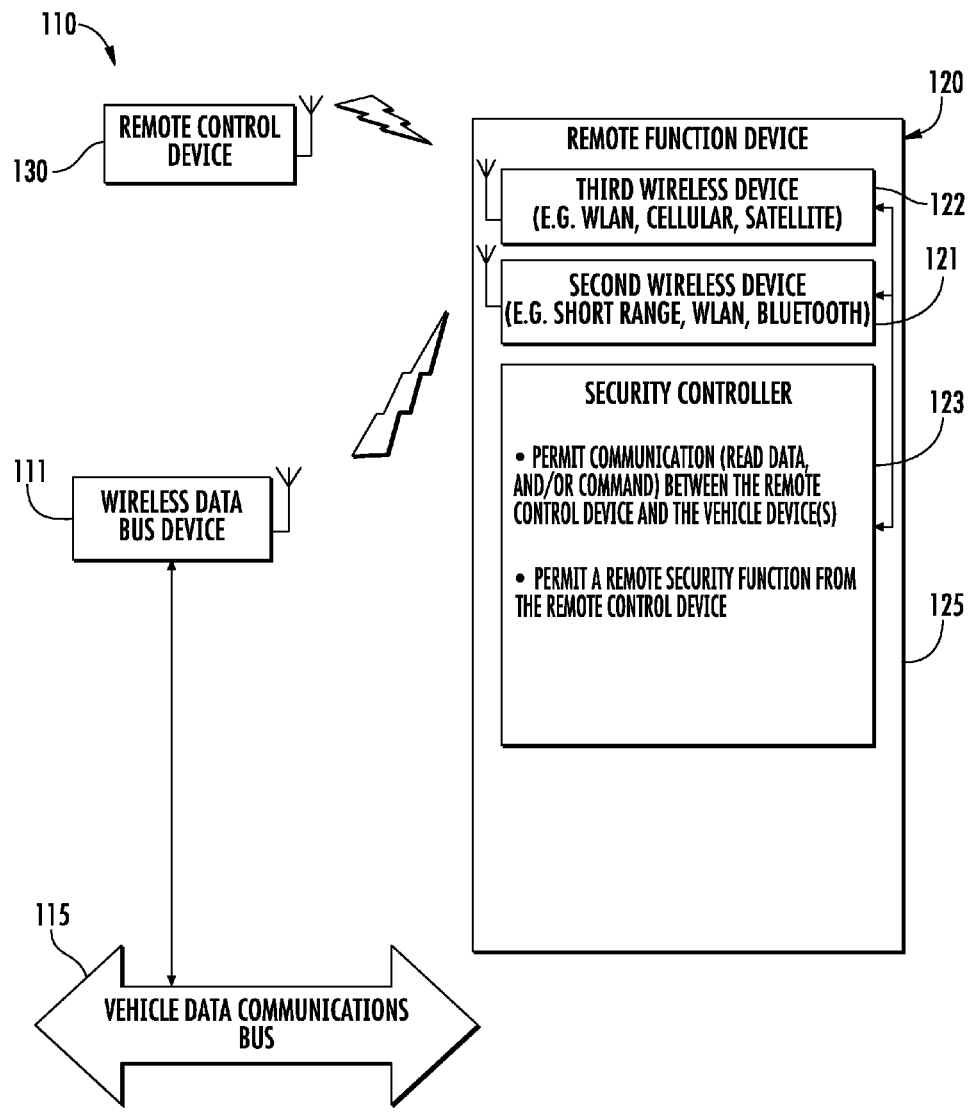
FIG. 6 is a block diagram of a remote function control system including a security controller in accordance with an embodiment of the present invention.

Referring now additionally to FIG. 6, in some embodiments, the controller 123 may be a security controller for performing a security function. For example, the remote control device 130 may cooperate with the security controller 123 to communicate with or activate a vehicle device 116a-116n, for example, a motion sensor, coupled to the vehicle data bus 115. As another example, the security controller 123 may communicate with the door locks coupled to the data communications bus 115 to send a door lock status to the remote control device 130. The security controller 123 may also send a vehicle device status, such as, for example, an alarm condition to the remote control device 130.

Figure 7:
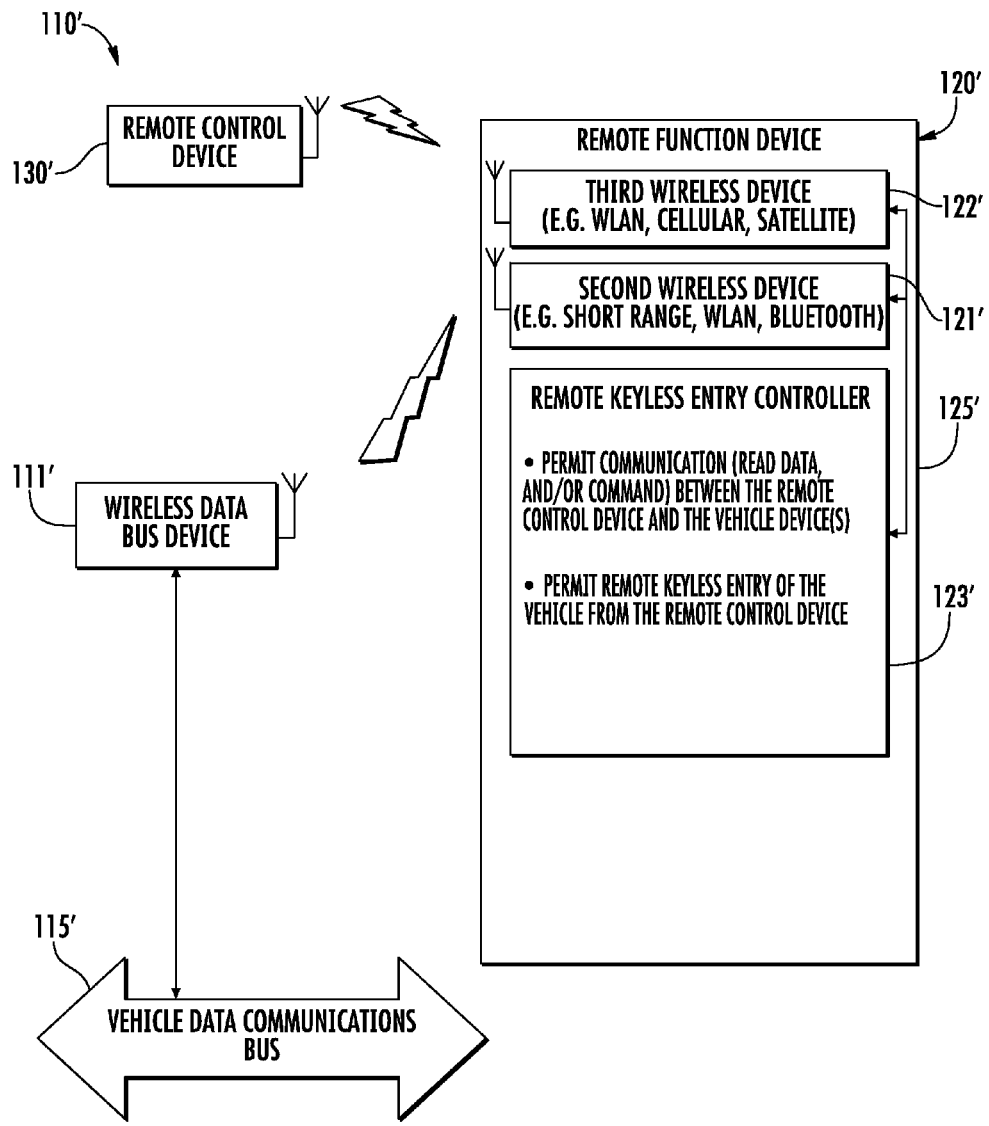
FIG. 7 is a block diagram of a remote function control system including a remote keyless entry controller in accordance with an embodiment of the present invention.

Referring now additionally to FIG. 7, the controller 123' may be a remote keyless entry controller for performing at least one remote keyless entry function. For example, the remote keyless entry controller 123' may permit communication from the remote control device 130' for unlocking the door locks. The remote control device 130' may also cooperate via the remote keyless entry controller 123' to lock the doors of the vehicle 134'.

Figure 8:
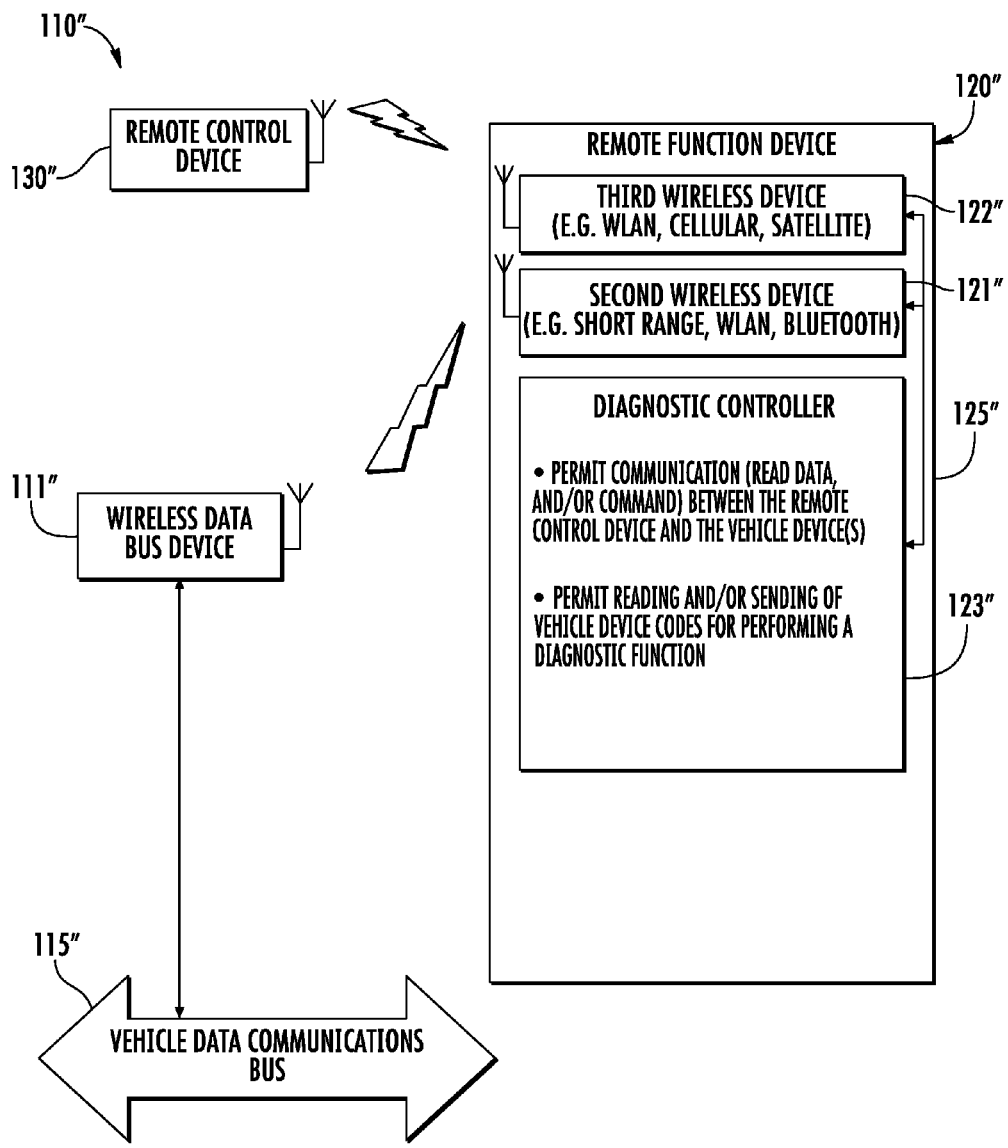
FIG. 8 is a block diagram of a remote function control system including a diagnostic controller in accordance with an embodiment of the present invention.

Referring now additionally to FIG. 8, the controller 123' may be a diagnostic controller for performing at least one diagnostic function. For example, the diagnostic controller 123" may permit communication for determining vehicle fault codes and communicating those codes to the remote control device 130". The remote control device 130" may be a portable computer, laptop or tablet, for example, and may wirelessly receive the vehicle fault codes. Diagnostic codes, for example, device reset codes, may be wirelessly sent from the portable computer 130" to one or more vehicle devices 116a"-116n" via the diagnostic controller 123".

Of course, while the controller 23 has been described in several examples, it should be understood that the controller may be more than one type of controller and configured to perform any one or more of the above-noted functions. Additional functions may be performed by the controller 23 as will be appreciated by those skilled in the art. For example, the controller 23 may be a climate controller and perform a climate controlling function, such as, changing the cabin temperature and fan speed.

Figure 9:
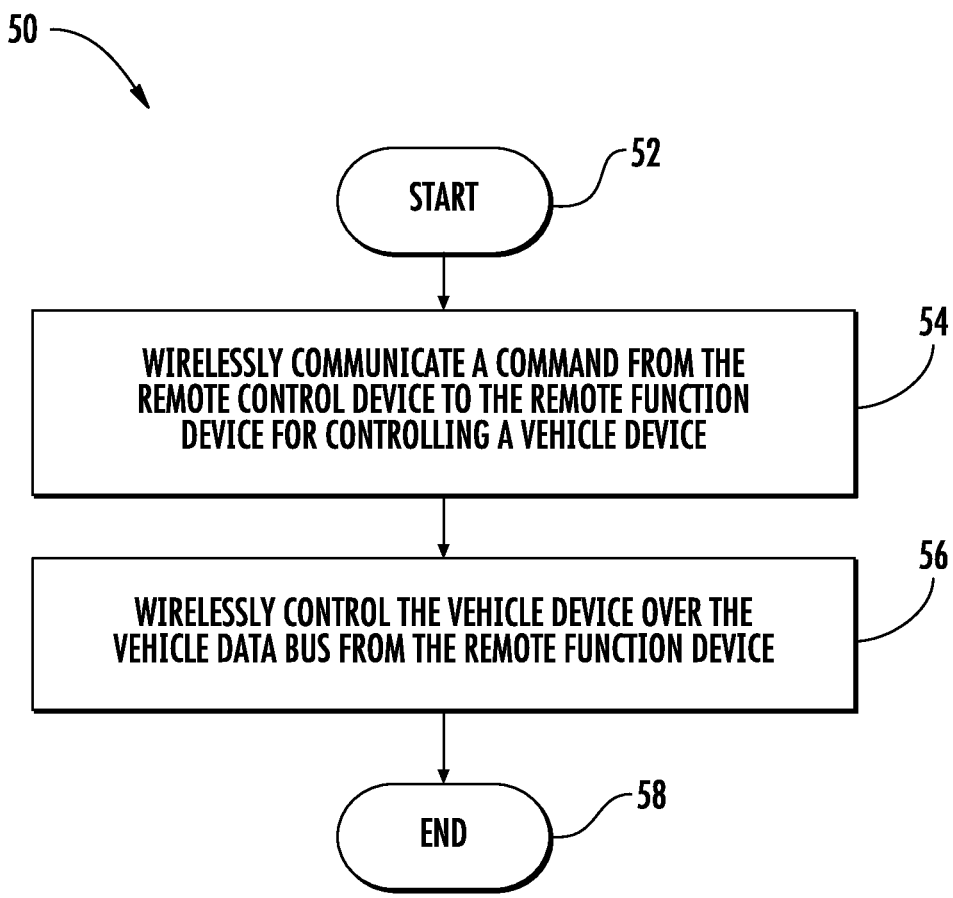
FIG. 9 is a flowchart illustrating operation of the remote function control system in accordance with the present invention.

Referring now to the flowchart 50 in FIG. 9, beginning at Block 52 a method of remotely controlling a vehicle function with a wireless data bus device coupled to a wired vehicle electrical power system 18 in a vehicle 34 including a data communications bus 15 extending throughout the vehicle and coupled to vehicle devices 16a-16n is described. The wireless data bus device 11 includes a wired interface 12 coupled to the data communications bus 15 in the vehicle 24, and a first wireless device 13 coupled to the wired interface. At Block 54, the remote function device, which is coupled to the vehicle electrical power system 18, communicates with, for example, receives a command from, the remote control device 30 via the third wireless communications device 22 to control a vehicle device 16a-16n. The controller 23 processes the command from the remote control device 30 and communicates with the vehicle device 16a-16n to perform the desired vehicle device operation. For example, the controller 23 may transmit a corresponding command, or a respective vehicle device bus code using a respective bus protocol to the vehicle device via the first and second wireless devices 13, 21 (Block 56). Thus, the controller 23 permits communication between the remote control device 30 and the vehicle device 16a-16n. The method ends at Block 58.

Figure 10:
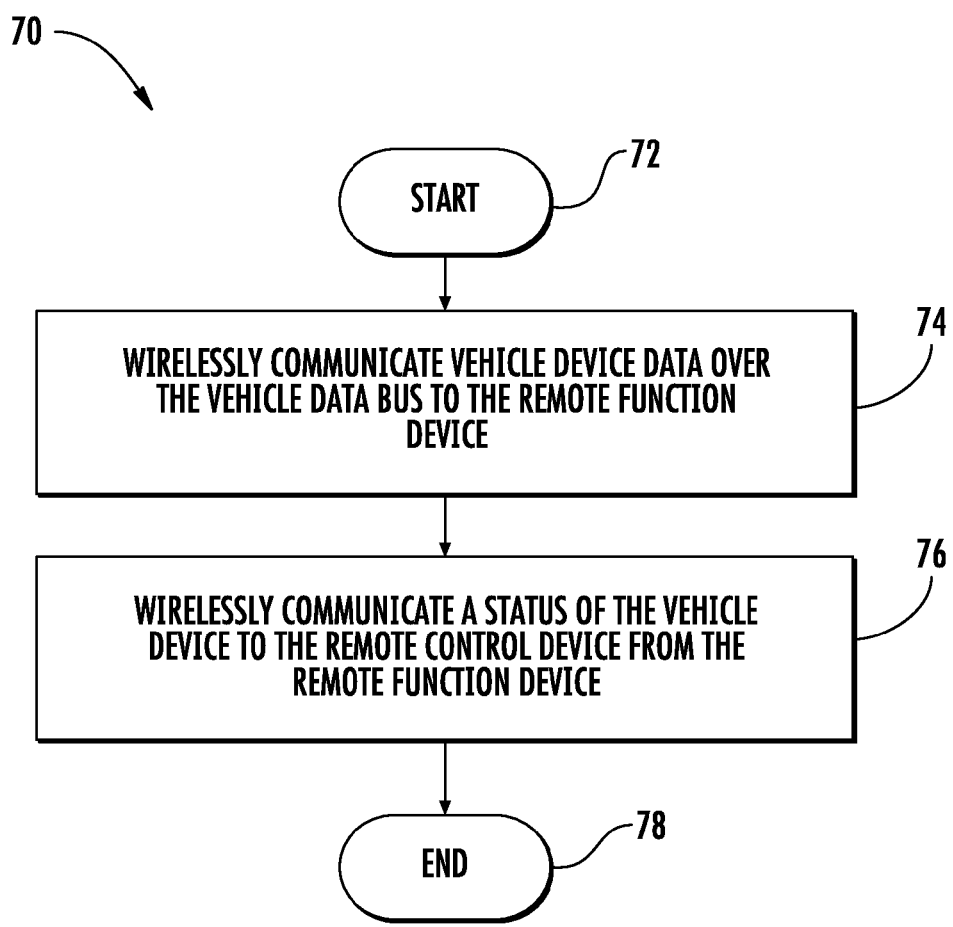
FIG. 10 is another flowchart illustrating operation of the remote function control system in accordance with the present invention.

Referring now to the flowchart 70 in FIG. 10, beginning at Block 72 a method of remotely controlling a vehicle function with a wireless data bus device 11 in a vehicle 34 including a data communications bus 15 extending throughout the vehicle and coupled to a plurality of vehicle devices 16a-16n is described. The wireless data bus device 11 includes a wired interface 12 coupled to the data communications bus 15 in the vehicle 34, and a first wireless device 13 coupled to the wired interface. At Block 74, data from the vehicle device 16a-16n, for example, a code, is communicated over the data communications bus 15 to the remote function device 20 via the first and second wireless devices 13, 21. The remote function device 20 communicates with the remote control device 30 to obtain the status of the vehicle device 16a-16n (Block 76). The method ends at Block 78.

Figure 11:
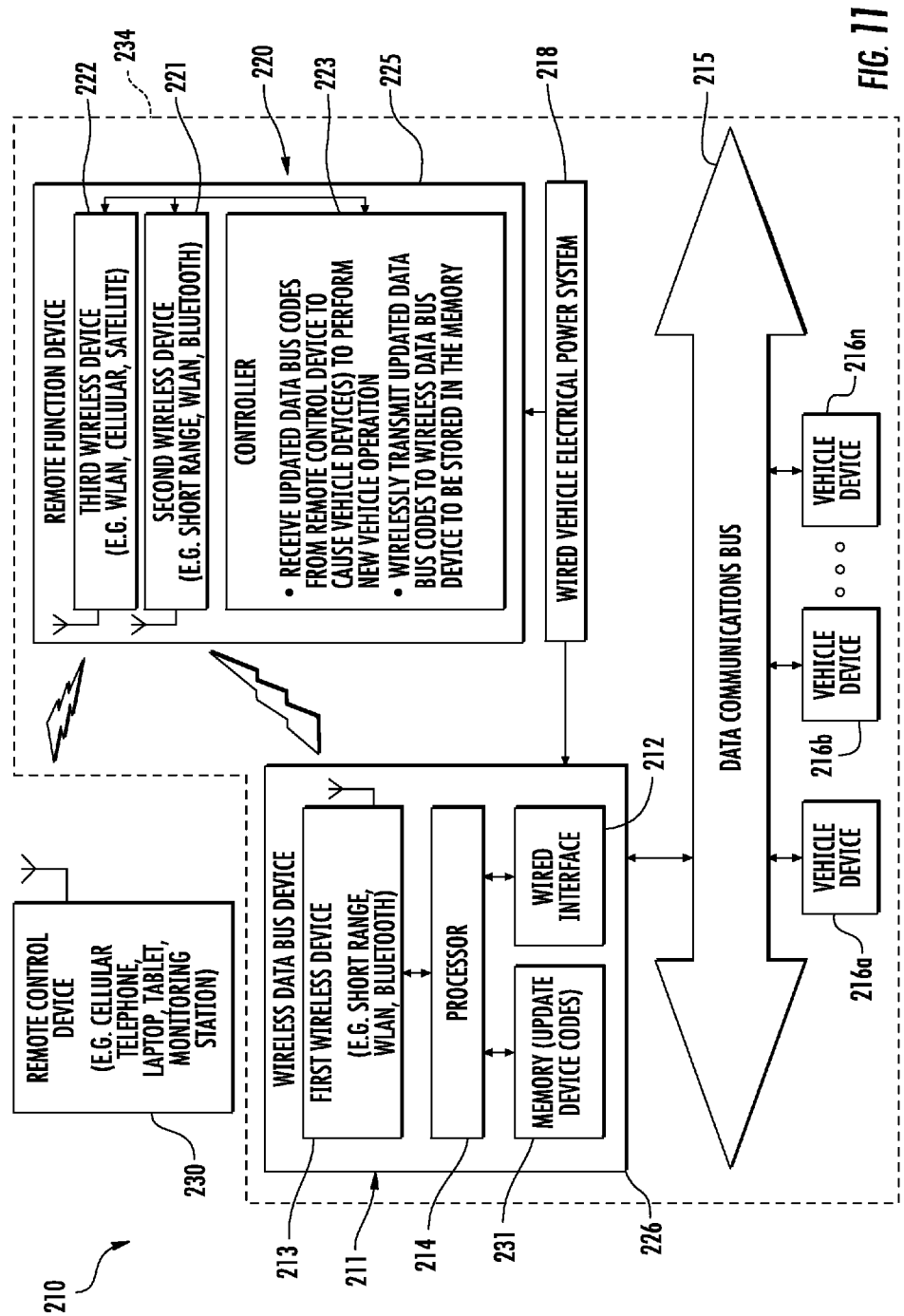
FIG. 11 is a block diagram of a remote function control system including a multi-function compatible controller in accordance with another embodiment of the present invention.
Figure 12:
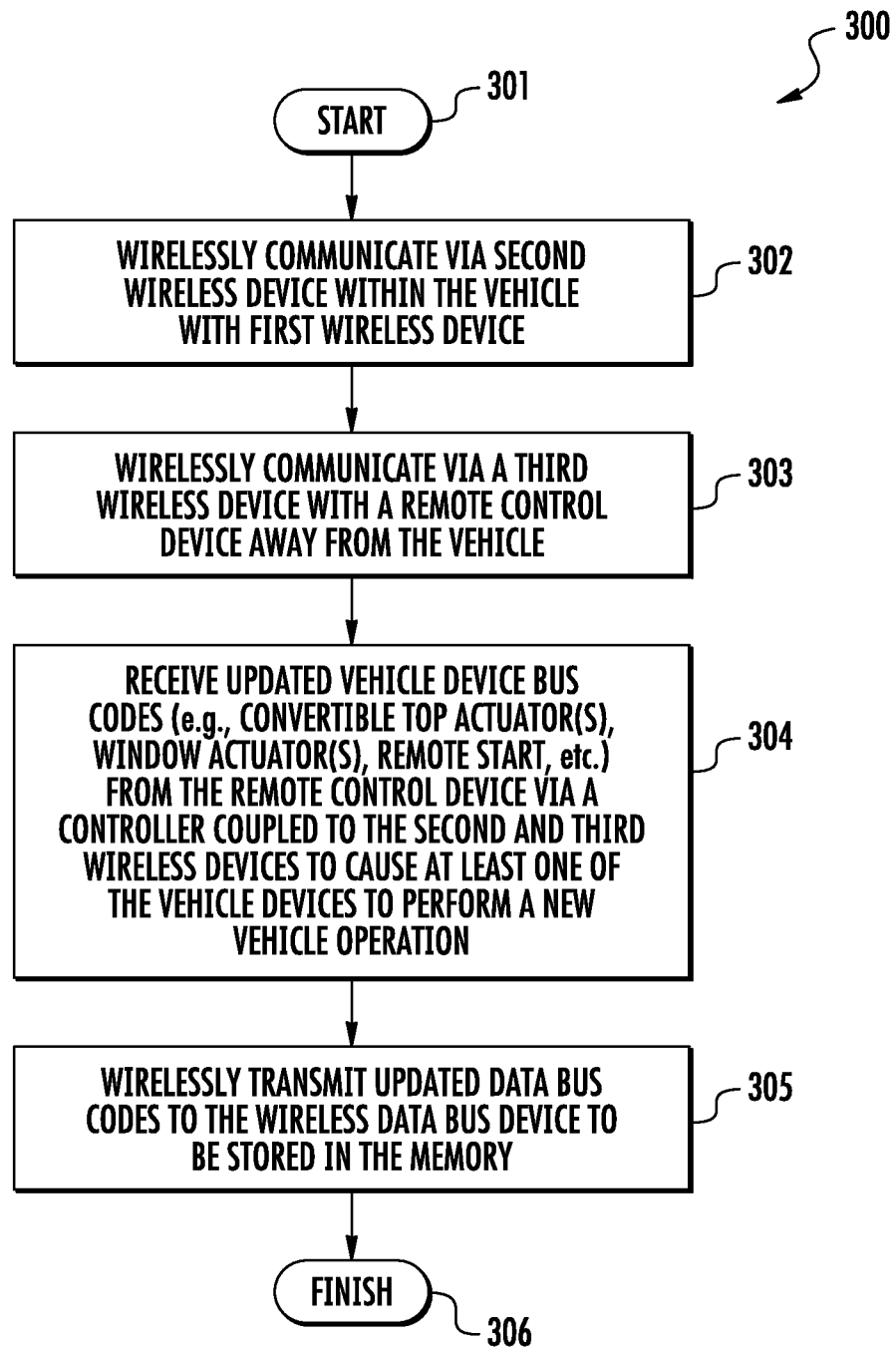
FIG. 12 is a flowchart illustrating method aspects associated with the system of FIG. 11.

Turning now additionally to FIG. 11 and the flow diagram 300 of FIG. 12, another example embodiment of the remote function control system 210 is provided for a vehicle 234 including a data communications bus 215 extending throughout the vehicle and coupled to a plurality of vehicle devices 216a-216n, and a wired vehicle electrical power system 218, similar to those discussed above. The system 210 also illustratively includes a wireless data bus device 211 coupled to the wired vehicle electrical power system 218 which illustratively includes a first housing 226, a wired interface 212 coupled to the data communications bus 215 in the vehicle, a first wireless device 213, and a processor 214 coupled to the wired interface 212 and the first wireless device 213, as similarly described above. Furthermore, the wireless data bus device 211 also illustratively includes a memory 231 coupled to the processor 231 which stores vehicle device bus codes for the plurality of vehicle devices 216a-216n.

The system 210 further illustratively includes a remote function device 220 coupled to the wired vehicle electrical power system 218 and including a second wireless device 221. Beginning at Block 301, the second wireless device 221 wirelessly communicates within the vehicle with the first wireless device 213, at Block 302, and a third wireless device 222 wirelessly communicates with a remote control device 230 away from the vehicle 234, at Block 303, as similarly described above.

A controller 223 is coupled to the second and third wireless devices, similar to the controllers discussed above. The controller 223 may advantageously receive updated vehicle device bus codes from the remote control device 230 to cause one or more of the vehicle devices 216a-216n to perform a new vehicle operation which had previously been "unlearned" to the wireless databus device 213, at Block 304, and wirelessly transmit the updated data bus codes to the wireless data bus device 211 to be stored in the memory 231, at Block 305, which illustratively concludes the method illustrated in FIG. 12 (Block 306).

More particularly, the remote function device 220 may advantageously be used to update the wireless databus device 213 for performing new operations that were not provided or available at the time of purchase of the vehicle 234. By way of example, if the vehicle 234 has a convertible top, one (or more) of the vehicle devices 216a-216n may be an actuator for raising and lowering the convertible top. As such, the updated data bus codes may be for causing the appropriate vehicle device(s) 216a-216n to raise and lower the convertible top. In accordance with a similar example, one or more of the vehicle devices 216a-216n may be vehicle window actuators, in which case the updated data bus codes may be for causing the window actuator(s) to raise and lower windows in the vehicle 234, as will be appreciated by those skilled in the art.

In yet another example, the updated data bus codes may be for causing one or more of the vehicle devices 216a-216n to perform a vehicle remote start operation, as discussed further above. In some implementations, the remote function device 220 may be coupled to a separate data bus (not shown) extending throughout the vehicle 234, such as an on-board diagnostics (OBD) bus with an OBD-II connection port, for example. In cases where vehicle devices other than the vehicle devices 216a-216n connected to the data communications bus 215 are required to help perform a remote start (or other) operation, the controller 223 may advantageously cooperate with the wireless data bus device 211 to control the other device(s) via the OBD (or other) data bus, while the wireless data bus device 211 controls the requisite vehicle devices 216a-216n, as will be appreciated those skilled in the art.

Furthermore, the remote function device 220 may be removably connectable or coupled to the vehicle, so that it may be removed and replaced in the vehicle if desired, or moved between vehicles. For example, the remote function device may be removably connectable to the wired vehicle electrical power system 218. In the above-noted example where the remote function device 220 connects to the OBD bus, this may be done via a removable connection to the OBD-II connection port, for example.

It should be noted that updated vehicle device bus codes for other vehicle devices 216a-216n besides those discussed above may be used in different embodiments. This approach may advantageously allow users to remotely control the newly added operations (e.g., convertible top, windows, remote starting, etc.) via an app installed on a smartphone, via a Web interface on a computer, etc., as will be appreciated by those skilled in the art.

Many modifications and other embodiments of the invention will come to the mind of one skilled in the art having the benefit of the teachings presented in the foregoing descriptions and the associated drawings. Therefore, it is That which is claimed is:

1. A remote function control system for a vehicle including a data communications bus extending throughout the vehicle and coupled to a plurality of vehicle devices, and a wired vehicle electrical power system, the system comprising:
   a wireless data bus device coupled to the wired vehicle electrical power system and comprising
      a wired interface coupled to the data communications bus in the vehicle,
      a memory to store vehicle device bus codes for the plurality of vehicle devices, and
      a first wireless device; and
   a remote function device coupled to the wired vehicle electrical power system and comprising
      a second wireless device to wirelessly communicate within the vehicle with the first wireless device,
      a third wireless device to wirelessly communicate with a remote control device away from the vehicle, and
      a controller coupled to the second and third wireless devices and configured to
         receive updated vehicle device bus codes from the remote control device,
         based upon the received updated vehicle device bus codes, cause at least one of the plurality of vehicle devices to perform a new vehicle operation not previously performed by the at least one vehicle device, and
         wirelessly transmit the updated vehicle device bus codes to the wireless data bus device so as to be stored in the memory for further use by the controller at a subsequent time.

2. The system of claim 1 wherein the at least one vehicle device comprises at least one convertible top actuator; and wherein the updated vehicle device bus codes are for causing the at least one convertible top actuator to raise and lower a convertible top.

3. The system of claim 1 wherein the at least one vehicle device comprises at least one vehicle window actuator; and wherein the updated vehicle device bus codes are for causing the at least one vehicle window actuator to raise and lower at least one vehicle window.

4. The system of claim 1 wherein the updated vehicle device bus codes are for causing the at least one vehicle device to perform a vehicle remote start operation.

5. The system of claim 1 wherein the controller comprises a multi-vehicle compatible controller to be operable with a plurality of different vehicles using respective different bus protocols.

6. The system of claim 1 wherein the controller comprises a multi-vehicle compatible controller to be operable with a plurality of different vehicles using respective different wireless communications protocols of the first wireless device.

7. The system of claim 1 wherein the controller comprises a multi-vehicle compatible controller to be operable with a plurality of different vehicles using respective different wireless communications codes of the first wireless device.

8. The system of claim 1 wherein the controller is to permit communication for the remote control device to command the at least one vehicle device.

9. The system of claim 1 wherein the remote function device further comprises a downloading interface coupled to the controller to permit downloading the updated vehicle device bus codes.

10. The system of claim 1 wherein the first and second wireless devices comprise first and second wireless local area network (WLAN) transceivers.

11. The system of claim 1 wherein the first and second wireless devices comprise first and second ultra high frequency (UHF) transceivers.

12. The system of claim 1 wherein the third wireless communications device comprises a satellite transceiver.

13. The system of claim 1 wherein the third wireless communications device comprises a cellular transceiver.

14. The system of claim 1 wherein the remote control device comprises a cellular telephone.

15. The system of claim 1 wherein the remote control device comprises a remote monitoring station.

16. The system of claim 1 wherein the remote function device further comprises a vehicle position determining device coupled to the controller; and wherein the controller comprises a tracking controller to perform at least one tracking function based upon vehicle position.

17. The system of claim 1 wherein said remote function device is removably coupled to the wired vehicle electrical power system.

18. A remote function device to be positioned within a vehicle for wirelessly communicating with a wireless data bus interface in the vehicle including a data communications bus extending throughout the vehicle and coupled to a plurality of vehicle devices, and a wired vehicle electrical power system, the wireless data bus device coupled to the wired vehicle electrical power system and comprising a wired interface coupled to the data communications bus in the vehicle, a memory to store vehicle device bus codes for the plurality of vehicle devices, and a first wireless device, the remote function device to be coupled to the wired vehicle electrical power system and comprising:
   a second wireless device to wirelessly communicate within the vehicle with the first wireless device;
   a third wireless device to wirelessly communicate with a remote control device away from the vehicle; and
   a controller coupled to the second and third wireless devices and configured to
      receive updated vehicle device bus codes from the remote control device,
      based upon the received updated vehicle device bus codes, cause at least one of the plurality of vehicle devices to perform a new vehicle operation not previously performed by the at least one vehicle device, and
      wirelessly transmit the updated vehicle device bus codes to the wireless data bus device so as to be stored in the memory for further use by the controller at a subsequent time.

19. The device of claim 18 wherein the at least one vehicle device comprises at least one convertible top actuator; and wherein the updated vehicle device bus codes are for causing the at least one convertible top actuator to raise and lower a convertible top.

20. The device of claim 18 wherein the at least one vehicle device comprises at least one vehicle window actuator; and wherein the updated vehicle device bus codes are for causing the at least one vehicle window actuator to raise and lower at least one vehicle window.

21. The device of claim 18 wherein the updated vehicle device bus codes are for causing the at least one vehicle device to perform a vehicle remote start operation.

22. The device of claim 18 wherein the controller comprises a multi-vehicle compatible controller to be operable with a plurality of different vehicles using respective different bus protocols.

23. The device of claim 18 wherein the controller comprises a multi-vehicle compatible controller to be operable with a plurality of different vehicles using respective different wireless communications protocols of the first wireless device.

24. The device of claim 18 wherein the controller comprises a multi-vehicle compatible controller to be operable with a plurality of different vehicles using respective different wireless communications codes of the first wireless device.

25. The device of claim 18 wherein the controller is to permit communication for the remote control device to command the at least one vehicle device.

26. The device of claim 18 further comprises a downloading interface coupled to the controller to permit downloading the updated vehicle device bus codes.

27. The device of claim 18 wherein the first and second wireless devices comprise first and second wireless local area network (WLAN) transceivers.

28. The device of claim 18 wherein the first and second wireless devices comprise first and second ultra high frequency (UHF) transceivers.

29. The device of claim 18 wherein the third wireless communications device comprises a satellite transceiver.

30. The device of claim 18 wherein the third wireless communications device comprises a cellular transceiver.

31. The device of claim 18 wherein the remote control device comprises a cellular telephone.

32. The device of claim 18 wherein the remote control device comprises a remote monitoring station.

33. The device of claim 18 wherein the remote function device further comprises a vehicle position determining device coupled to the controller; and wherein the controller comprises a tracking controller to perform at least one tracking function based upon vehicle position.

34. A method for remotely controlling a vehicle function with a wireless data bus coupled to a wired vehicle electrical system in a vehicle including a data communications bus extending throughout the vehicle and coupled to a plurality of vehicle devices, the wireless data bus device comprising a wired interface coupled to the data communications bus in the vehicle, a memory to store vehicle device bus codes for the plurality of vehicle devices, and a first wireless device, the method comprising:
using a remote function device coupled to the wired vehicle electrical power system to
wirelessly communicate via a second wireless device within the vehicle with the first wireless device,
wirelessly communicate via a third wireless device with a remote control device away from the vehicle,
receive updated vehicle device bus codes from the remote control device via a controller coupled to the second and third wireless devices, the controller causing at least one of the plurality of vehicle devices to perform a new vehicle operation not previously performed by the at least one vehicle device based upon the received updated vehicle device bus codes, and
wirelessly transmit the updated vehicle device bus codes to the wireless data bus device so as to be stored in the memory for further use by the controller at a subsequent time.

35. The method of claim 34 wherein the at least one vehicle device comprises at least one convertible top actuator; and wherein the updated vehicle device bus codes are for causing the at least one convertible top actuator to raise and lower a convertible top.

36. The method of claim 34 wherein the at least one vehicle device comprises at least one vehicle window actuator; and wherein the updated vehicle device bus codes are for causing the at least one vehicle window actuator to raise and lower at least one vehicle window.

37. The method of claim 34 wherein the updated vehicle device bus codes are for causing the at least one vehicle device to perform a vehicle remote start operation.

38. The method of claim 34 wherein the controller comprises a multi-vehicle compatible controller to be operable with a plurality of different vehicles using respective different bus protocols.

39. The method of claim 34 wherein the controller comprises a multi-vehicle compatible controller to be operable with a plurality of different vehicles using respective different wireless communications protocols of the first wireless device.

40. The method of claim 34 wherein the controller comprises a multi-vehicle compatible controller to be operable with a plurality of different vehicles using respective different wireless communications codes of the first wireless device.

41. The method of claim 34 wherein the controller is to permit communication for the remote control device to command the at least one vehicle device.

42. The method of claim 34 wherein the remote function device further comprises a downloading interface coupled to the controller to permit downloading the updated vehicle device bus codes.

* * * * *